(12) United States Patent
Exeter

(10) Patent No.: US 7,835,470 B2
(45) Date of Patent: Nov. 16, 2010

(54) DATA SLICER REFERENCE GENERATOR FOR MULTIPLE BURST DATA SIGNALS

(75) Inventor: George R. Exeter, West Lothian (GB)

(73) Assignee: Micrel, Incorporated, San Jose, CA (US)

( * ) Notice: Subject to any disclaimer, the term of this patent is extended or adjusted under 35 U.S.C. 154(b) by 576 days.

(21) Appl. No.: 11/968,608

(22) Filed: Jan. 2, 2008

(65) Prior Publication Data

US 2009/0168928 A1 Jul. 2, 2009

(51) Int. Cl.
*H04L 27/06* (2006.01)
*H03M 1/02* (2006.01)

(52) U.S. Cl. ...................... 375/340; 341/155

(58) Field of Classification Search ................. 375/316, 375/340; 327/51, 52, 54, 56; 341/126, 155, 341/158, 159
See application file for complete search history.

(56) References Cited

U.S. PATENT DOCUMENTS 6,493,396 B1 * 12/2002 Nguyen et al. .............. 375/279
2005/0220066 A1 * 10/2005 Wal et al. ..................... 370/343

* cited by examiner

*Primary Examiner*—Tesfaldet Bocure
(74) *Attorney, Agent, or Firm*—Bever, Hoffman & Harms, LLP; Patrick T. Bever

(57) ABSTRACT

A slice level reference generator and method for performing improved data slicing operations when gaps are present in a data stream is disclosed that involves applying a nominal reference signal to the comparator the during signal gaps. In one embodiment, a receiver circuit includes a slice level detector and a comparator that operate in a conventional manner, and control circuitry that utilizes a signal detector and a switch to store a slice level reference signal generated by the slice level detector during a first signal burst, and to apply the stored reference signal to the comparator during signal gaps. In one embodiment a timer circuit is used to detect signal gaps. In another embodiment a predetermined fixed reference signal is applied to the comparator during signal gaps.

18 Claims, 4 Drawing Sheets

US 7,835,470 B2

DATA SLICER REFERENCE GENERATOR FOR MULTIPLE BURST DATA SIGNALS

FIELD OF THE INVENTION

This invention relates to the recovery of digital data from an analog signal stream, and in particular to the recovery of digital data from analog signals consisting of data bursts having significant intervening gaps.

BACKGROUND OF THE INVENTION

In a radio receiver, and in other systems where digital data is transmitted as analog pulses, it is common practice to convert the received analog data signal to a digital data output signal using a reference signal and a comparator that compares the analog signal with the reference signal. When the analog signal is greater than reference signal, the digital data signal is generated at a high voltage level, and when the analog signal is less than the reference signal, the digital data signal is generated at a low voltage level. In this way, the digital data encoded in the analog signal is decoded and presented in a usable form to a downstream digital circuit.

To account for different analog signal strengths, the reference signal in most receiver circuits is derived from the received analog signal using a circuit referred to as a slice level detector. That is, if a fixed reference signal were used to determine the digital data, then weaker and stronger analog signals would tend to produce different digital data. To avoid this problem, a slice level detector is used to generate a sliced level reference signal that adjusts to the signal strength of the received analog signal, thereby facilitating more reliable conversion of both weaker and stronger signals to corresponding digital data.

Two examples of receiver circuits utilizing conventional slice level detectors are described below with reference to FIGS. 6 and 7.

FIG. 6 is a simplified representation showing 40 including a mean slice level detector 41 and a comparator 42. Analog signal modulation information (analog signal) S, which is treated using one or more filters and amplifiers, (not shown), is applied to the non-inverting input terminal of comparator 42, and is also transmitted to mean slice level detector 41. Mean slice level detector 41 includes an RC filter that filters analog signal S to produce a mean slice level signal $V_{SLICE-MEAN}$, which includes only the mean voltage level of analog signal S. Mean slice level signal $V_{SLICE-MEAN}$ is applied to the inverting input terminal of comparator 42 for use as a reference that adjusts with the level of analog signal S. That is, when analog signal S is strong, mean slice level signal $V_{SLICE-MEAN}$ is generated at a relatively high voltage level that represents the mean voltage level of the stronger analog signal, and when analog signal S is relatively weak, mean slice level signal $V_{SLICE-MEAN}$ is generated at a relatively low voltage level that represents the mean voltage level of the weaker analog signal. In this way, both weak and strong analog signals S are reliably consistently decoded and presented in a usable form to a downstream digital circuit (not shown).

In an alternative embodiment, peak slice level detectors may be employed to measure the positive and negative signal peaks of the received analog signal, and to generate an intermediate peak level signal (referred to herein as a "peak slice level reference signal") that can be established more rapidly. FIG. 7 is a simplified representation showing a receiver circuit 50 including a conventional peak slice level detector 51 and a comparator 52. Analog signal S is applied to the non-inverting input terminal of comparator 52, and is also transmitted to mean slice level detector 51. Peak slice level detector 51 includes a positive peak generator circuit 53 that utilizes a first comparator C1 and an associated transistor T1 and RC filter to generate a positive peak signal, and a negative peak generator circuit 54 that utilizes a second comparator C2 and an associated transistor T2 and RC filter to generate a negative peak signal. It is usual to employ filtering of the derived reference level (e.g., using the RC filters of peak slice level detector 51) prior to use as the data slicing comparator reference signal. The positive and negative peak signals are combined to generate peak slice level reference signal $V_{SLICE-PEAK}$ that is applied to the inverting input terminal of comparator 52 for use as the reference, and is also applied to one terminal of a filter capacitor C.

FIGS. 8(A) and 8(B) are timing diagrams illustrating how the mean level and peak detecting slice reference generation circuits of the prior art, illustrated in FIGS. 6 and 7, will tend to discharge towards a zero volt signal level during gaps between data bursts, leading to difficulty recovering undistorted data at the beginning of the next signal burst, and the possibility of unwanted transient noise on the output data. FIG. 8(A) shows a received analog signal S being characterized by a first signal burst between time T0 and T1, a second signal burst starting at time T3, and a signal gap (i.e., a period that does not include digital data) between times T1 and T3. FIG. 8(B) shows digital output signal $V_{OUT}$, which is generated by comparator 52 (see FIG. 7) in response to analog signal S. A problem associated with conventional peak and mean slice level reference generation is that, as indicated in FIG. 8(A), peak slice level reference signal $V_{SLICE-PEAK}$ cannot be maintained in the absence of the data pulses associated with BURST 1, and starts to decay, as indicated by the downward slanting dashed line portion starting at time T1. At time T2 peak slice level reference signal $V_{SLICE-PEAK}$ drops to approximately zero volts, resulting in undefined noise being generated by comparator 52 prior to the next data transition (BURST 2) during times T2 and T3 (see FIG. 8(B)), and slice level reference signal $V_{SLICE-PEAK}$ not being optimum at the start of the following data burst (BURST 2, starting at time T3) with the possibility of severely distorted recovered data bits.

What is needed is a circuit and method for performing improved data slicing operations when gaps are present in a data stream.

SUMMARY OF THE INVENTION

The present invention is directed to a slice level reference generator and method for performing improved data slicing operations when gaps are present in a data stream by applying a nominal reference signal to the comparator during signal gaps, thus preventing unwanted output noise pulses and minimizing output data pulse distortion during subsequent signal bursts.

In accordance with an embodiment of the present invention, a receiver circuit includes a slice level detector and a comparator that operate in a manner similar to conventional receiver circuits, but also includes additional circuitry that applies the slice level reference signal generated by the slice level detector to the inverting input terminal of the comparator during each signal burst, and applies a predetermined nominal reference signal to the inverting input terminal of the comparator during the signal gaps that occur between the signal bursts. By transmitting a predetermined nominal reference signal to the comparator during the signal gaps that is close to the expected slice level reference signal produced during the subsequent signal burst, the present invention avoids the noise generation and distorted data that can be generated using conventional slice level reference generation circuitry.

In accordance with an aspect of the present invention, the additional circuitry utilized to selectively apply either the slice level reference signal or the predetermined nominal reference signal to the inverting input terminal of the comparator generally includes a switch, a nominal reference source for generating said predetermined nominal reference signal, and a control circuit for controlling the switch. The switch is positioned between the inverting input terminal of the comparator and at least one of the slice level detector and the nominal reference source such that, in one operating state, the switch transmits the slice level reference signal from the slice level detector to the inverting input terminal of the comparator (i.e., in response to a first control signal generated during the signal bursts), and in a second operating state, the switch transmits the predetermined nominal reference signal from the nominal reference source to the inverting input terminal of the comparator (i.e., in response to a second control signal generated during the signal gaps). In a specific embodiment, the control circuit includes a timer circuit having a reset terminal connected to an output terminal of the comparator, a clock input terminal for receiving a clock signal, and an output terminal connected to a control terminal of the switch. The timer circuit monitors the digital output signal, and controls the switch to pass the predetermined nominal reference signal to the comparator only when the digital output signal drops below a predetermined amplitude for a predetermined number of clock cycles. Utilizing such a control circuit and a switch to control the inverting input terminal of the comparator facilitates a simple and reliable method of selectively applying either the slice level reference signal or the nominal reference signal to the comparator.

In accordance with alternative embodiments, the nominal reference signal can either be a stored slice reference signal, which was generated during a preceding signal burst, or an independently generated reference signal having a predetermined (fixed) voltage level. Further, the slice reference signal can be generated using a conventional peak level slice level detector or a conventional mean slice level detector.

In a first disclosed embodiment, the switch is a MOS transistor connected between a peak slice level detector and the inverting input terminal of the comparator, and the reference source is formed by a grounded capacitor that is connected to the inverting input terminal. During signal bursts, the MOS transistor is closed (turned on) so that the slice level reference signal is transmitted to the inverting input terminal and is stored on the capacitor. During signal gaps, the MOS transistor is turned off to isolate the slice level detector from the comparator, and the stored slice level reference signal is applied to the inverting input terminal by the capacitor. By utilizing the stored slice level reference signal as the nominal reference signal, the present invention provides a reliable reference signal that adjusts for weak and strong signals.

In an alternative embodiment, the nominal reference signal is generated by a reference voltage source that is separated from the inverting input terminal of the comparator by a MOS transistor. During signal bursts, the MOS transistor is turned off (opened) so that the comparator is isolated from the voltage source, and the slice level reference signal is transmitted to the inverting input terminal of the comparator. During signal gaps, the MOS transistor is turned on (closed), and the nominal reference signal is transmitted from the reference voltage source to the inverting input terminal of the comparator. By utilizing the reference voltage source, the natural decay of the slice level and the possibility of noise in the sliced data that can occur with the prior art is avoided.

In accordance with another embodiment, a method for generating a digital output signal in response to a received analog signal includes supplying the analog signal to the non-inverting input terminal of a comparator and to a slice level detector, applying the generated slice level reference signal to the inverting input terminal of the comparator during signal bursts, and applying a predetermined nominal reference signal to the inverting input terminal of the comparator during signal gaps.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to an improvement in slice reference generators. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
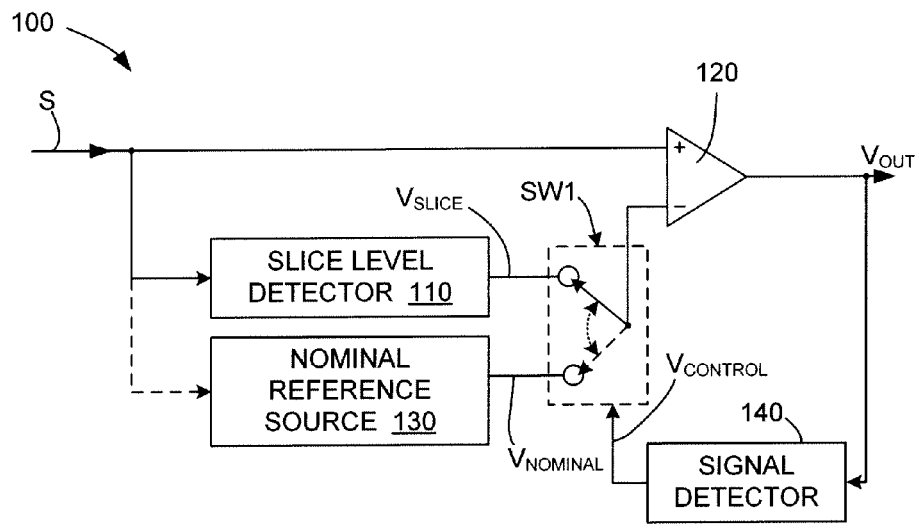
FIG. 1 is a simplified circuit diagram showing a generalized receiver circuit according to an embodiment of the present invention.

FIG. 1 is a simplified circuit diagram showing a generalized receiver circuit 100 according to an embodiment of the present invention. Receiver circuit 100 includes a slice level detector 110 and a comparator 120 that operate in a manner similar to conventional receiver circuits, described above, but also includes a nominal reference source 130 and a signal detector 140 that controls a switch SW1 to apply a slice level reference signal $V_{SLICE}$ generated by slice level detector 110 to the inverting (−) input terminal of comparator 120 during signal bursts, and to apply a predetermined nominal reference signal $V_{NOMINAL}$ to the inverting input terminal of comparator 120 during signal gaps.

Figure 2A:
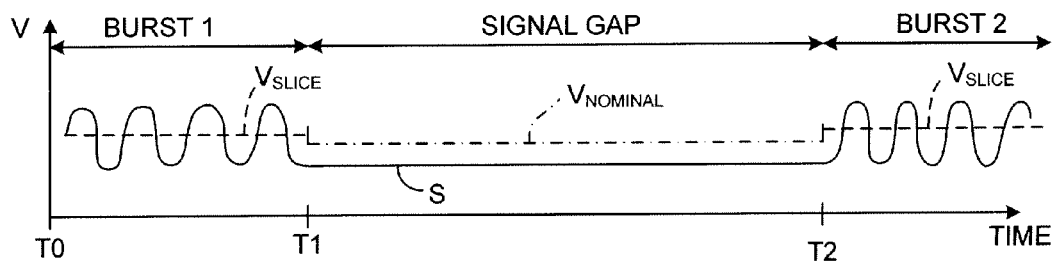
FIGS. 2(A) and 2(B) are timing diagrams illustrating signals generated in the receiver of FIG. 1.
Figure 2B:
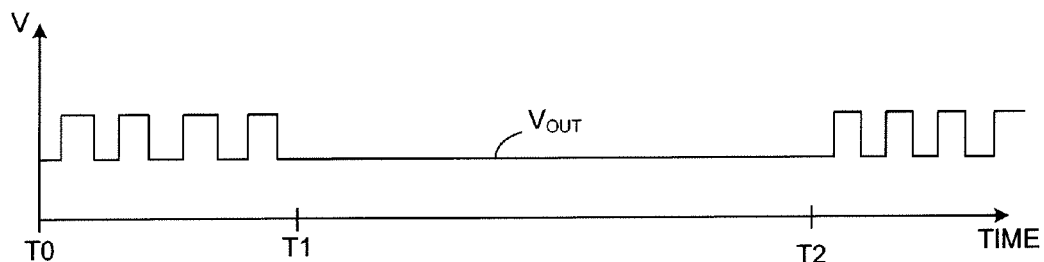

Signal detector 140 generates control signal $V_{CONTROL}$ by detecting signal gaps using one of the digital output signal $V_{OUT}$ and the analog signal S. In one embodiment, as indicated by the arrow on the right side of FIG. 1, signal detector 140 monitors digital output signal $V_{OUT}$ to determine when received analog signal S includes a signal burst, and when received analog signal S includes a signal gap. The relationship between an exemplary analog signal S and a corresponding digital output signal $V_{OUT}$ is shown in FIGS. 2(A) and 2(B), where FIG. 2(A) shows received analog signal S, and FIG. 2(B) shows digital output signal $V_{OUT}$. Referring to FIG. 2(A), exemplary analog signal S includes a first signal burst BURST 1 from time T0 to time T1 and a second signal burst BURST 2 starting at time T2 separated by a signal gap ("SIGNAL GAP" in FIG. 2(A)), which extends from time T1 to time T2 and is distinguished from each signal burst by being essentially flat (zero signal level) throughout the gap time period T1 to T2. Corresponding digital output signal $V_{OUT}$ includes a square wave pattern during signal bursts (e.g., during the time period T0 to T1 and during the time period starting at time T2; see FIG. 2(B)), and includes a prolonged, substantially zero signal level during the signal gap (e.g., during the time period T1 to T2; FIG. 2(B)). As set forth in the exemplary specific embodiments below, signal detector 140 distinguishes signal bursts from signal gaps by detecting the prolonged, substantially zero volt signal associated with the signal gap periods. In a specific embodiment described below, a timer circuit is utilized to perform the signal gap detection operation, but in alternative embodiments other non-timer detection methods may be utilized.

Nominal reference source 130 generates nominal reference signal $V_{NOMINAL}$ at a voltage level that is determined by the signal strength of analog signal S (as indicated by the horizontal dashed line arrow pointing to the left side of nominal reference source 130 in FIG. 1), but may be generated at a predetermined voltage level that is independent of analog signal S. An advantage to generating nominal reference signal $V_{NOMINAL}$ using analog signal S is that, because the strength of a burst-type signal typically does not change significantly between bursts, setting the amplitude (voltage level) of nominal reference signal $V_{NOMINAL}$ to the signal strength of a first burst (e.g., BURST 1, shown in FIG. 2(A)) provides a reasonably accurate prediction of the signal strength of a subsequent burst (e.g., BURST 2, shown in FIG. 2(A)), thereby minimizing signal distortion at the beginning of the subsequent burst. Alternatively, a carefully selected voltage level of nominal reference signal $V_{NOMINAL}$ may also be used that avoids the noise problems associated with conventional approaches.

Figure 3:
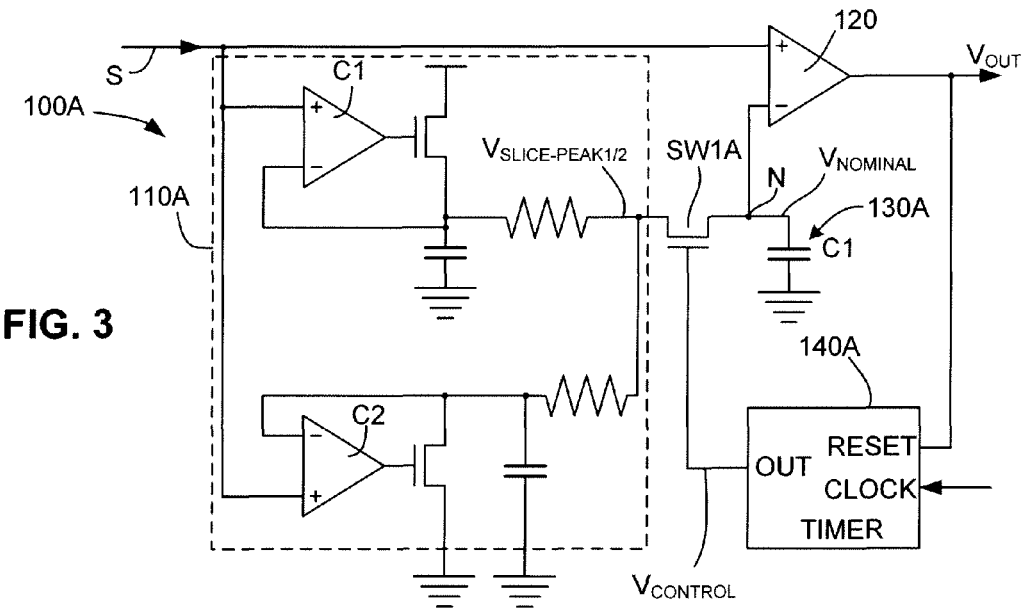
FIG. 3 is a simplified circuit diagram showing a receiver circuit according to a specific embodiment of the present invention.
Figure 7:
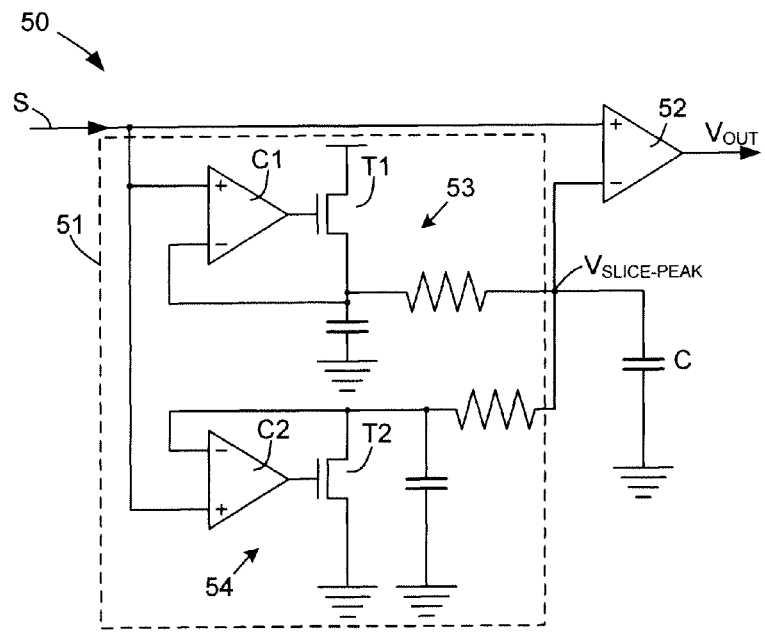
FIG. 7 is a simplified circuit diagram showing another conventional receiver circuit.
Figure 8A:
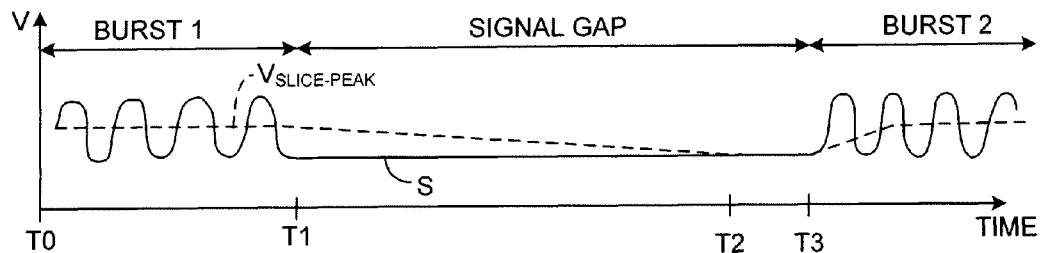
FIGS. 8(A) and 8(B) are timing diagrams illustrating signals generated in the receiver of FIG. 7.
Figure 8B:
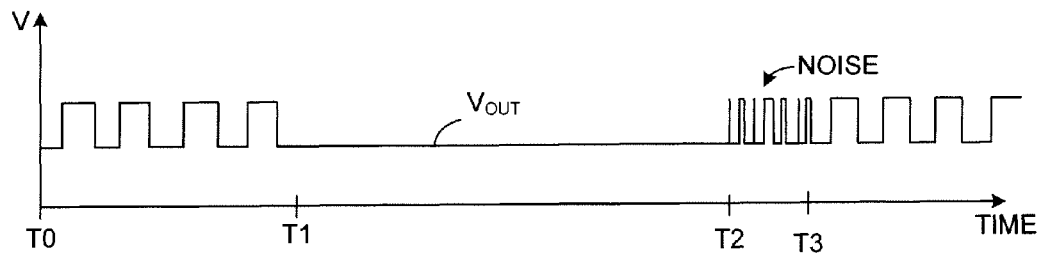

FIG. 3 is a simplified circuit diagram showing a radio receiver 100A according to an exemplary specific embodiment of the present invention. Radio receiver 100A includes a conventional peak-type slice level detector 110A, a comparator 120, a nominal reference source 130A, and a timer (control) circuit 140A. Peak-type slice level detector 110A generates slice level reference signals $V_{SLICE-PEAK1}$ and $V_{SLICE-PEAK2}$ (depicted as signal $V_{SLICE-PEAK1/2}$ in FIG. 3) during corresponding first and second signal bursts in accordance with the description provided above with reference to FIG. 7. Comparator 120 has a non-inverting (+) input terminal connected to receive analog signal S, and an inverting (−) input terminal that is connected to a node N. Switch SW1A is a MOS transistor connected between an output terminal of slice level detector 110A and node N. Nominal reference source 130A includes a capacitor C1 having a first terminal connected to node N, and a second terminal connected to a fixed voltage source (e.g., in this embodiment, ground).

Figure 4A:
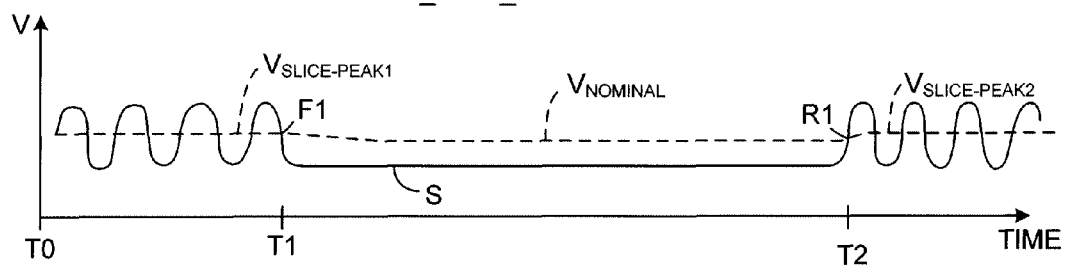
FIGS. 4(A), 4(B), and 4(C) are timing diagrams illustrating signals generated in the receiver of FIG. 3.
Figure 4B:
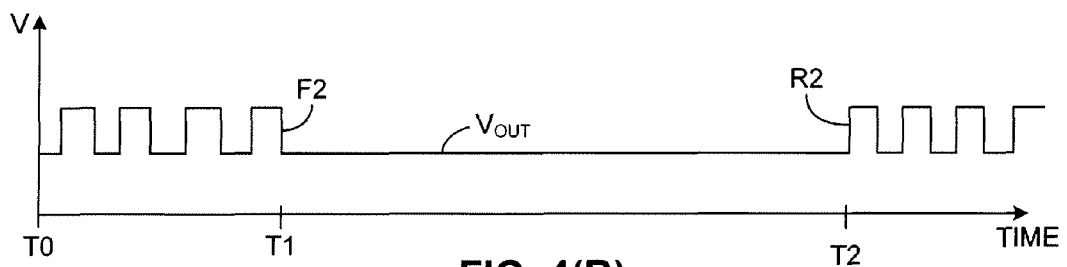
Figure 4C:
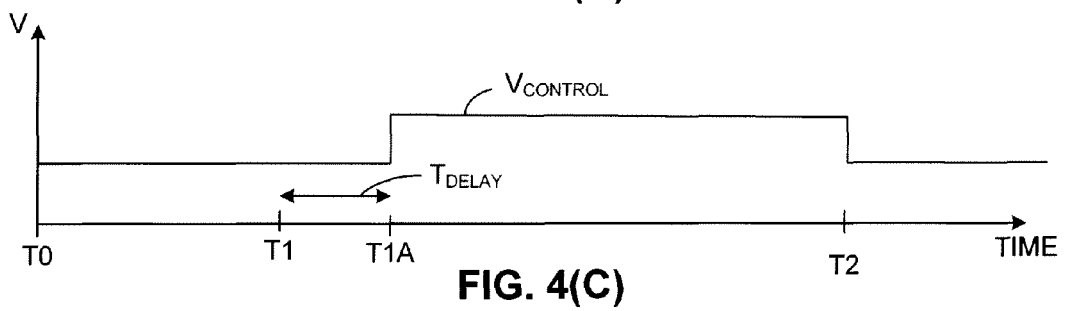

In accordance with the first specific embodiment, timer circuit 140A is designed and fabricated using standard digital counter/timer or retriggerable monostable multivibrator techniques, and includes a reset terminal (RESET) connected to receive digital output signal $V_{OUT}$, a clock input terminal (CLOCK) for receiving a clock signal (which is generated using circuitry (not shown) according to known techniques), and an output terminal connected to a control terminal of switch SW1. Timer circuit 140A monitors digital output signal $V_{OUT}$, and generates control signal $V_{CONTROL}$ such that switch SW1A is turned on (closed) to pass a slice level reference signal (e.g., $V_{SLICE-PEAK1}$ or $V_{SLICE-PEAK2}$) to the inverting input terminal of comparator 120 during signal bursts, and such that switch SW1A is turned off (opened) to isolate any residual slice level reference signal from reaching the inverting input terminal of comparator 120 during signal gaps. In particular, referring to FIG. 4(A), analog signal S is characterized by first signal burst (time T0 to T1) and second signal burst (starting at time T2) that are separated by a signal gap (T1 to T2). A final falling edge F1 of the first burst of analog signal S at time T1 generates a corresponding falling edge F2 of digital signal $V_{OUT}$, and a subsequent first rising edge R1 of the second burst of analog signal S generates a corresponding rising edge of digital output signal $V_{OUT}$ at time T2. As indicated in FIG. 4(C), timer circuit 140A monitors digital signal $V_{OUT}$ for signal gaps by detecting periods when digital output signal $V_{OUT}$ drops below a predetermined amplitude for period greater than the expected bit duration, e.g., as measured by a predetermined number of clock cycles. As indicated in FIG. 4(C), this signal gap detection operation involves measuring the time between data pulses, and asserting control signal $V_{CONTROL}$ when a predetermined delay period $T_{DELAY}$ passes without incurring a next falling (or rising) edge. For example, timer circuit 140A begins counting clock cycles at time T1 (i.e., corresponding to falling edge F2), and asserts control signal $V_{CONTROL}$ at time T1A when delay period $T_{DELAY}$ is reached. Control signal $V_{CONTROL}$ remains asserted until rising edge R2, which is detected by reset terminal RESET, and causes timer circuit 140A to then reset and to de-assert control signal $V_{CONTROL}$. It will be understood by those skilled in the art that to implement the above-described function, timer circuit 140A may be made with either a digital counter or a retriggerable one-shot circuit. Longer data pulses will be little affected by this circuit operation; therefore, it is not essential that delay period $T_{DELAY}$ be always greater than the data period.

According to another aspect of the present invention, switch SW1, reference source 130A and timer circuit 140A function to store a currently generated slice level reference signal during a particular signal burst, and to supply the stored slice level reference signal as the nominal reference signal to the inverting input terminal of comparator 120 during subsequent signal gap. In particular, as indicated in FIG. 4(A), timer circuit 140A turns on switch SW1A during first signal burst (time T0 to time T1) to both apply slice level reference signal $V_{SLICE-PEAK1}$ to the inverting input terminal of comparator 120, and to cause capacitor C1 (reference source 130A) to store slice level reference signal $V_{SLICE-PEAK1}$ generated during the first signal burst. In this way the slice reference level is maintained on the capacitor C1, close to the desired operating level, during gaps between transmitted data bursts. At time T1A timer circuit 140A de-asserts control signal $V_{CONTROL}$ (FIG. 4(C)), which turns off switch SW1A to isolate note N from slice level detector 110A, which in turn causes nominal reference signal $V_{NOMINAL}$ (i.e., the stored slice level reference signal, shown FIG. 4(A)) to be applied onto the inverting input terminal of comparator 120, thereby avoiding the noise generation and distorted data that can be generated using conventional slice level reference generation. Subsequently, at time T2, the rising edge R2 of digital output signal $V_{OUT}$ resets timer circuit 140A (FIG. 4(C)), which turns on switch SW1A to apply slice level reference signal $V_{SLICE-PEAK2}$ to the inverting input terminal of comparator 120.

Figure 5:
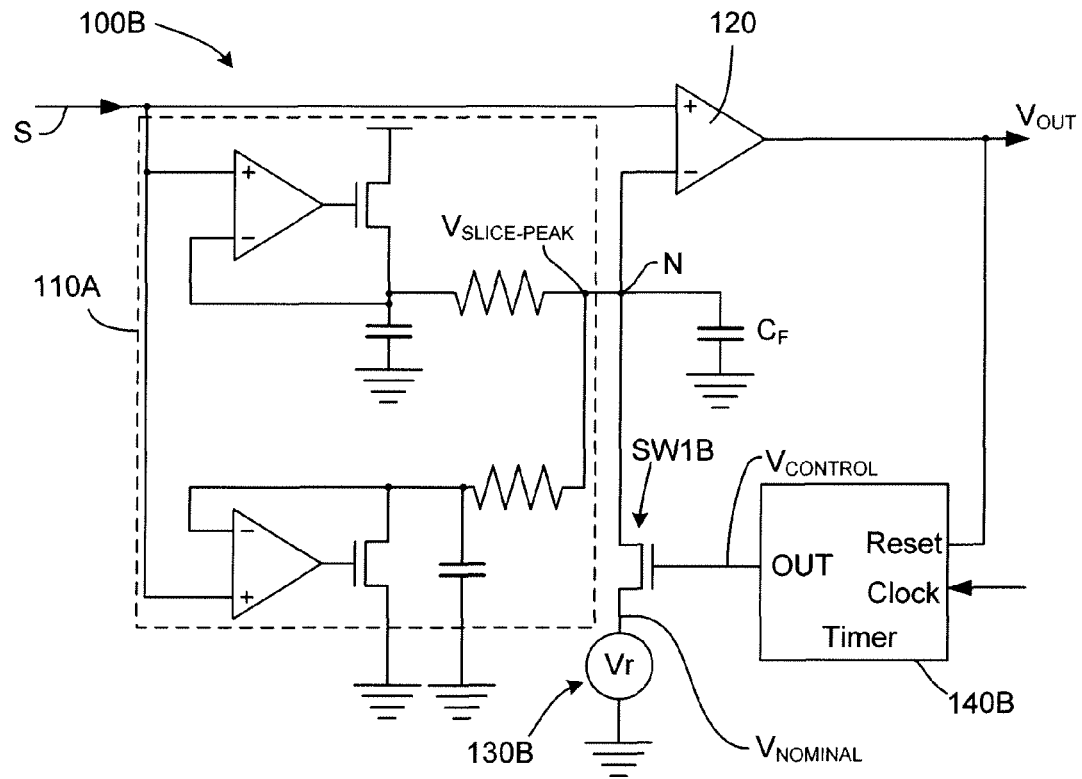
FIG. 5 is a simplified circuit diagram showing a receiver circuit according to another specific embodiment of the present invention.
Figure 6:
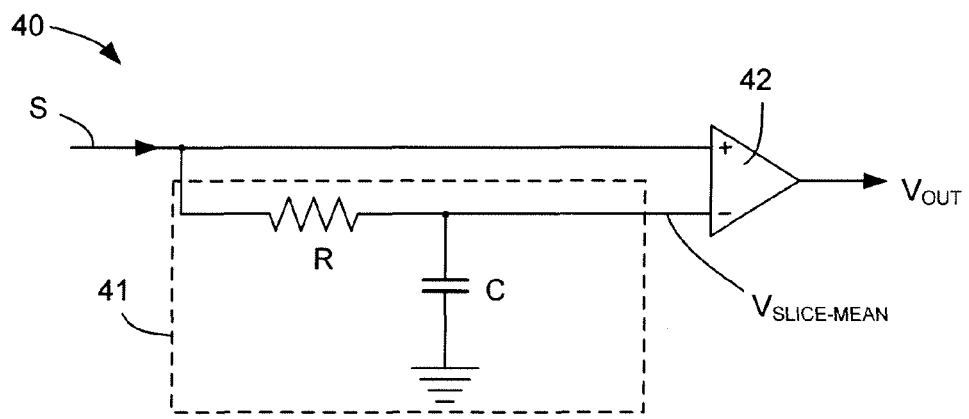
FIG. 6 is a simplified circuit diagram showing a conventional receiver circuit.

FIG. 5 shows a radio receiver 100B according to an alternative embodiment in which a predetermined (fixed) nominal reference voltage $V_{NOMINAL}$ is used to define the data slicing level during signal gaps, as determined by timer circuit 140B (which operates in essentially the same manner as described above with reference to timer circuit 140A). In this embodiment, the source of predetermined nominal reference voltage $V_{NOMINAL}$ is a reference voltage generator 130B, which is separated from the inverting input terminal of comparator 120 (node N) by a MOS switch SW1B. During signal bursts, switch SW1B is turned off to allow slice level reference signal $V_{SLICE-PEAK}$ to be applied to the inverting input terminal of comparator 120 (capacitor $C_F$ serves in this embodiment as a filter capacitor). During signal gaps, switch SW1B is turned on to pass nominal reference signal $V_{NOMINAL}$ to comparator 120 by way of node N.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. A receiver circuit for generating a digital output signal in response to a received analog signal, the analog signal being characterized by a first signal burst and a second signal burst separated by a signal gap, the receiver circuit comprising:
a slice level detector for generating a slice level reference signal in response to an amplitude of said analog signal;
a comparator having a first terminal connected to receive the analog signal, a second terminal, and means for generating said digital output signal on an output terminal; and
means for applying said slice level reference signal to said second input terminal of said comparator during said first and second signal bursts, and for applying a predetermined nominal reference signal to said second input terminal of said comparator during said signal gap.

2. The receiver circuit according to claim 1, wherein said means comprises:
a switch having a first terminal connected to the second input terminal of the comparator, a second terminal, and a control terminal;
a nominal reference source for generating said predetermined nominal reference signal; and
means for controlling said switch to transmit said slice level reference signal from the slice level detector to said second input terminal of said comparator during said first and second signal bursts, and for controlling said switch to transmit said predetermined nominal reference signal from said nominal reference source to said second input terminal of said comparator during said signal gap.

3. The receiver circuit according to claim 2, wherein said means for controlling comprises a timer circuit including a reset terminal connected to an output terminal of said comparator, a clock input terminal for receiving a clock signal, and an output terminal connected to a control terminal of the switch, wherein said timer circuit includes means for transmitting a control signal to said switch only when said digital output signal drops below the predetermined amplitude for a predetermined number of cycles of said clock signal, whereby said switch connects said second input terminal of the comparator to receive the nominal reference signal from the reference source.

4. The receiver circuit according to claim 3,
wherein said switch comprises a MOS transistor connected between the slice level detector and the second input terminal of the comparator, and
wherein the reference source comprises a capacitor having a first terminal connected to the second terminal of the comparator, and a second terminal connected to a fixed voltage source.

5. The receiver circuit according to claim 4, wherein the slice level detector comprises means for generating a positive signal peak level signal and a negative signal peak level signal of said analog signal, and for generating said slice level reference signal by combining the positive and negative signal peak level signals.

6. The receiver circuit according to claim 2,
wherein the reference source comprises a reference voltage generator,
wherein said switch comprises a MOS transistor connected between the reference voltage generator and the second input terminal of the comparator.

7. The receiver circuit according to claim 6, wherein the second input terminal of the comparator is connected to receive the slice level reference signal from the slice level detector.

8. The receiver circuit according to claim 7, wherein the slice level detector comprises means for generating a positive signal peak level signal and a negative signal peak level signal of said analog signal, and for generating said slice level reference signal by combining the positive and negative signal peak level signals.

9. A receiver circuit for generating a digital output signal in response to a received analog signal, the analog signal being characterized by a first signal burst and a second signal burst separated by a signal gap, the receiver circuit comprising:
a slice level detector for generating a first slice level reference signal in response to an amplitude of said analog signal during said first data burst, and for generating a second slice level signal in response to an amplitude of said analog signal during said second data burst;
a comparator having a first terminal connected to receive the analog signal, a second terminal, and means for generating said digital output signal at a first level when said received analog signal is greater than a signal applied to said second terminal, and for generating said digital output signal at a second signal level when said received analog signal is less than the signal applied to said second terminal;
means for applying said first slice level reference signal to said second input terminal of said comparator during said first signal burst, for storing the first slice level reference signal and for applying said stored first slice level reference signal to said second input terminal of said comparator during said signal gap, and for applying said second slice level reference signal to said second input terminal of said comparator during said second signal burst.

10. The receiver circuit according to claim 9, wherein said means comprises:
a switch having a first terminal connected to the second input terminal of the comparator, a second terminal connected to the slice level detector, and a control terminal;
means for controlling said switch to transmit said first and second slice level reference signals from the slice level detector to said second input terminal of said comparator during said first and second signal bursts, respectively, and for controlling said switch to isolate the second input terminal of the comparator from said slice level detector during said signal gap; and a capacitor connected to said second input terminal of said comparator such that said capacitor stores said first slice level reference signal during said first data burst, and applies said stored first slice level reference signal to said second input terminal during said data gap.

11. The receiver circuit according to claim 10, wherein said means for controlling comprises a timer circuit including a reset terminal connected to an output terminal of said comparator, a clock input terminal for receiving a clock signal, and an output terminal connected to a control terminal of the switch, wherein said timer circuit includes means for transmitting a control signal to the control terminal of said switch only when said digital output signal drops below the predetermined amplitude for a predetermined number of cycles of said clock signal.

12. The receiver circuit according to claim 11, wherein the slice level detector comprises means for generating a positive signal peak level signal and a negative signal peak level signal of said analog signal, and for generating said slice level reference signal by combining the positive and negative signal peak level signals.

13. A method for generating a digital output signal in response to a received analog signal, the analog signal being characterized by a first signal burst and a second signal burst separated by a signal gap, the method comprising:

applying the analog signal to a first input terminal of a comparator;

generating a slice level reference signal in response to an amplitude of said analog signal;

applying said slice level reference signal to a second input terminal of the comparator during said first and second signal bursts, and applying a predetermined nominal reference signal to said second input terminal of the comparator during said signal gap.

14. The method of claim 13, wherein the slice level reference signal comprises controlling a switch connected between said second input terminal of comparator and one of said slice level detector and a nominal reference source, wherein the predetermined nominal reference signal is generated by said nominal reference source.

15. The method of claim 14, wherein controlling said switch comprises comparing said digital output signal with a clock signal, and transmitting a control signal to said switch only when said digital output signal drops below a predetermined amplitude for a predetermined amount number of cycles of said clock signal.

16. The method claim 15, wherein applying said slice level reference signal comprises storing a first slice level reference signal generated during said first signal burst, and wherein applying said predetermined nominal reference signal comprises applying said stored first slice level reference signal to said second input terminal of the comparator during said signal gap.

17. The method of claim 16, wherein generating said slice level reference signal comprises generating a positive signal peak level signal and a negative signal peak level signal of said analog signal, and combining the positive and negative signal peak level signals.

18. The method of claim 14, wherein applying said predetermined nominal reference signal comprises controlling a switch to pass said predetermined nominal reference signal from a reference voltage generator to said second input terminal of the comparator during said signal gap.

* * * * *